United States Patent
Kong

(10) Patent No.: US 8,196,083 B1
(45) Date of Patent: Jun. 5, 2012

(54) INCREMENTAL PLACEMENT AND ROUTING

(75) Inventor: Raymond Kong, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 20 days.

(21) Appl. No.: 12/964,126

(22) Filed: Dec. 9, 2010

(51) Int. Cl.
*G06F 9/455* (2006.01)
*G06F 17/50* (2006.01)

(52) U.S. Cl. ......... 716/126; 716/113; 716/129; 716/130

(58) Field of Classification Search .................. 716/113, 716/126, 129, 130
See application file for complete search history.

(56) References Cited

U.S. PATENT DOCUMENTS

| | | | |
|---|---|---|---|
| 5,867,396 A | 2/1999 | Parlour | |
| 6,484,292 B1 | 11/2002 | Jain et al. | |
| 6,871,336 B1 | 3/2005 | Anderson | |
| 7,086,029 B1 | 8/2006 | Barras et al. | |
| 7,086,030 B1 | 8/2006 | Stroomer et al. | |
| 7,134,112 B1 * | 11/2006 | Anderson et al. | 716/113 |
| 7,149,993 B1 | 12/2006 | Aggarwal et al. | |
| 7,428,718 B1 | 9/2008 | Singh et al. | |
| 7,490,312 B1 * | 2/2009 | Ochotta et al. | 716/125 |
| 7,536,661 B1 | 5/2009 | Singh et al. | |
| 7,590,951 B1 | 9/2009 | Bell, II et al. | |
| 7,620,927 B1 * | 11/2009 | Ochotta et al. | 716/105 |
| 2011/0055791 A1 * | 3/2011 | Gao | 716/131 |

OTHER PUBLICATIONS

U.S. Appl. No. 12/751,175, filed Mar. 31, 2010, Arslan et al.
Kelley, Kate, *Maintaining Repeatable Results*, WP361 (v 1.1), Mar. 31, 2010, pp. 1-9, Xilinx, Inc., San Jose, California, USA.
Kelley, Kate, *Repeatable Results with Design Preservation*, WP362 (v 1.0), Mar. 31, 2010, pp. 1-5, Xilinx, Inc., San Jose, California, USA.
Xilinx, Inc., *Synthesis and Simulation Design Guide*, UG626 (v 11.4), Dec. 2, 2009, pp. 147-159, Xilinx, Inc., San Jose, California, USA.
Xilinx, Inc., *Hierarchical Design Methodology Guide*, UG748 (v 12.2), Jul. 23, 2010, pp. 1-44, Xilinx, Inc., San Jose, California, USA.
Zeh, Chris, *Incremental Design Reuse with Partitions*, XAPP918 (v 1.0), Jun. 7, 2007, pp. 1-17, Xilinx, Inc., San Jose, California, USA.

* cited by examiner

*Primary Examiner* — Suresh Memula
(74) *Attorney, Agent, or Firm* — LeRoy D. Maunu

(57) ABSTRACT

In one embodiment, a method is provided for incremental routing of a circuit design having modified and unmodified signals. Critical routed signals of the partially routed circuit design are determined. For each critical routed signal, a first set of routing constraints is applied to prevent rerouting of the signal. The partially routed circuit design is routed according to the first set of routing constraints to produce a non-conflicting routing solution. In response to the non-conflicting routing solution not meeting timing requirements, the first set of routing constraints is removed and post-routing optimization processes are performed on the non-conflicting routing solution to reduce propagation delay of one or more signals.

20 Claims, 4 Drawing Sheets

INCREMENTAL PLACEMENT AND ROUTING

FIELD OF THE INVENTION

One or more embodiments generally relate to the placement and routing of circuits, and more specifically to incremental placement and routing.

BACKGROUND

A conventional design process for an integrated circuit, such as an ASIC or a circuit to be implemented on a field programmable gate array (FPGA) or other programmable logic device, begins with the creation of the design. The design specifies the function of a circuit at a schematic or logic level and may be represented using various programmable languages (e.g., VHDL, ABEL or Verilog) or schematic capture programs. The design is synthesized to produce a logical network list ("netlist") supported by a target integrated circuit device. The synthesized design is mapped to primitive components within the target device (e.g., programmable logic blocks of an FPGA).

Following mapping, placement of the components of the synthesized and mapped design is then performed for the target device. During placement, each mapped component of the design is assigned to a physical position on the chip. One objective of the placer is to place connected design objects in close physical proximity to one another. This conserves space on the chip and increases the probability that the desired interconnections between components will be successfully completed by the router. Placing connected components close to one another also generally improves the performance of the circuit, since long interconnect paths are associated with excess capacitance and resistance, resulting in longer delays.

Specified connections between components of the design are routed within the target device for the placed components. Routing specifies physical wiring resources that will be used to conduct signals between pins of placed components of the design. For each connection specified in the design, routing must allocate wiring necessary to complete the connection. As used herein, the selection and assignment of wire resources in connecting the output pin of one component to the input pin of another component is referred to as routing a signal. When signals have been routed using most or all of the wiring resources in a given area, the area is generally referred to as congested, which creates competition for the remaining wiring resources in the area or makes routing of additional signals in the area impossible. A routing solution free of congestion may be referred to as a congestion-free solution or a non-conflicting routing solution, and such terms may be used interchangeably herein.

Once a routing solution is found, some routing procedures also involve post-routing optimization methods to improve a circuit's timing, power consumption, routing resources utilized, and any combination thereof. In some instances, timing-based estimations of the design are also provided.

The circuit design process generally includes functional and timing simulations to verify correct operation prior to manufacturing. A design may be modified several times to correct errors identified during testing. Whenever a modification is made, the place-and-route procedures must be repeated for the modified design. Due to the large amount of time required for placement and routing of an entire design, it is desirable to avoid repeating the entire place-and-route process when only a small portion of the design has changed.

A design may be modified several times throughout the development process. One solution to avoiding the repeating of the entire process of optimization and place-and-route is to perform place-and-route with criteria to preserve placed and routed portions of the design, which are not changed. This is known as incremental placement and routing. Current incremental routing methods continue routing until a routing solution is found that is non-conflicting and meets timing requirements for all signals. Due in-part to the large number of possible routing solutions, current incremental place-and-route methods often make early non-optimal routing choices and fail to review those early routing choices, which may constrict the algorithm to a non-optimal local maxima.

Due to congestion resulting from these early routing choices, it may not be possible to route the modified signals of the design and meet all timing requirements without rerouting some signals of the unchanged portion of the design. While the routing algorithm attempts to preserve routing of the routed signals as much as possible, routed signals are often re-routed in an attempt to remove congestion or improve timing performance of other signals. However, some of the routed signals may have strict timing requirements that are difficult to meet. These signals are referred to as critical signals. Once unrouted, it may be difficult to find an alternative route that meets these strict timing requirements. In addition, previous optimization of these signals will likely be lost once the signals are rerouted. As a result, a design that previously met timing requirements may no longer meet the same timing requirements after incorporating latest design changes.

The number of rerouted signals along with the resulting timing may depend largely on the early routing choices of the algorithm, producing unpredictable results in performance. As a result, routing may need to be repeated a number of times before an acceptable routing result is be achieved. The failure to (or the variability to) achieve timing closure after an incremental revision of the design may increase the overall number of implementation iterations (or total runtime) needed to produce a feasible solution that meets all requirements and thereby result in a negative consumer experience.

One or more embodiments may address one or more of the above issues.

SUMMARY

In one embodiment, a method is provided for incremental routing of a circuit design having modified and unmodified signals. Critical routed signals of the partially routed circuit design are determined. For each critical routed signal, a first set of routing constraints is applied to prevent rerouting of the signal. The partially routed circuit design is routed according to the first set of routing constraints to produce a non-conflicting routing solution. In response to the non-conflicting routing solution not meeting timing requirements, the first set of routing constraints is removed and post-routing optimization processes are performed on the non-conflicting routing solution to reduce propagation delay of one or more signals.

In another embodiment, a system is provided for incremental routing of a partially routed circuit design having modified and unmodified signals. The system includes a processor and a memory configured with instructions that when executed by the processor cause the processor to determine critical routed signals of the partially routed circuit design. For each critical routed signal, a first set of routing constraints is applied to prevent rerouting of the signal. The instructions further cause the processor to route the partially routed circuit design according to the first set of routing constraints to produce a non-conflicting routing solution. In response to the non-conflicting routing solution not meeting timing requirements, the instructions cause the processor to remove the first set of routing constraints and perform post-routing optimization on the non-conflicting routing solution to reduce propagation delay of one or more signals.

In yet another embodiment, an article of manufacture is provided. The article is characterized by a processor-readable storage medium configured with processor-executable instructions causing one or more processors to route a partially routed circuit design having modified and unmodified signals from a previous version of the circuit design. The instructions when executed by a processor cause the processor to determine critical routed signals of the partially routed circuit design. For each critical routed signal, a first set of routing constraints is applied to prevent rerouting of the signal. The instructions further cause the processor to route the partially routed circuit design according to the first set of routing constraints to produce a non-conflicting routing solution. In response to the non-conflicting routing solution not meeting timing requirements, the instructions cause the processor to remove the first set of routing constraints and perform post-routing optimization on the non-conflicting routing solution to reduce propagation delay of one or more signals.

It will be appreciated that various other embodiments are set forth in the Detailed Description and Claims, which follow.

BRIEF DESCRIPTION OF THE DRAWINGS

Various aspects and advantages will become apparent upon review of the following detailed description and upon reference to the drawings, in which.

DETAILED DESCRIPTION

Figure 1:
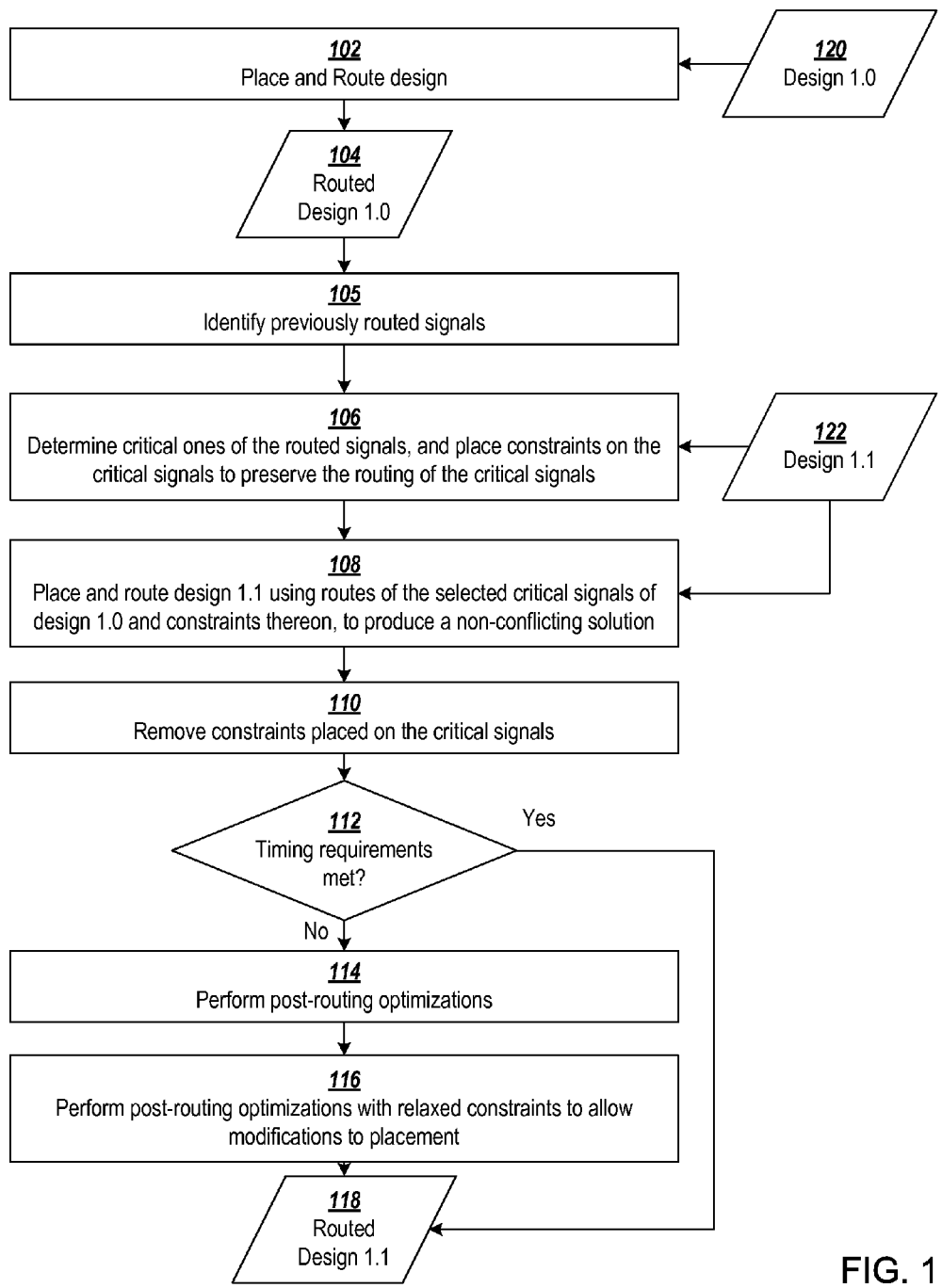
FIG. 1 shows a flowchart of an example process for partial place and route.

Current incremental routing methods continue routing until a routing solution is found that is non-conflicting and meets timing requirements for all signals. While the routing algorithm attempts to preserve routing of the routed signals as much as possible, routed signals are often re-routed in an attempt to remove congestion or improve timing performance of other signals. However, some of the routed signals may have strict timing requirements that are difficult to meet. Rerouting of these signals may dramatically increase the time required to find a suitable solution, or in a worse case the result of the rerouting may not meet the same timing requirements that were met prior to the rerouting.

One or more embodiments provide a system and method for routing that does not continue to rip up and reroute signals to meet timing constraints once a non-conflicting solution is found. Rather, timing requirements are met through post-routing optimization. In post-routing optimization, a signal is not rerouted unless an alternative route is first discovered that has timing equal to or better than the current route. By removing the requirement that all timing requirements be met in the initial place-and-route, it is highly likely a non-conflicting routing solution can be found without unrouting critical unmodified signals, thereby preserving previous routing results for critical signals and preserving overall design circuit performance. As a result, predictability of the resulting circuit performance can be increased, and the time needed to reroute and optimize critical ones of the routed signals can be avoided.

In one or more embodiments, the predictability of resulting circuit performance can be increased and routing time may be improved by distinguishing critical routed signals that are likely to be difficult to reroute from non-critical routed signals that are likely to be easy to reroute. Despite incremental design changes, one or more embodiments maintain previously met circuit performance by preserving critically routed signals. If a signal is likely to be easily rerouted, the routing algorithm will not waste processing time trying to preserve routing of the signal. Generally, a routable solution is less likely to be available when fewer routing resources are available. By allowing, non-critical signals to be rerouted if necessary, routing resources (e.g. wires) are freed for routing more critical signals. As a result, more routing options are made available and a non-conflicting solution is more likely to be found while avoiding rerouting of any signals likely to have demanding timing requirements. In this manner, previously met circuit performance is preserved, and the time needed to find a non-conflicting solution is likely to be improved.

Critical ones of the routed signals may be identified by determining and analyzing the slack in the paths of the routed signals. Slack refers to the difference between the maximum allowed propagation delay of a signal path required for correct operation and the actual propagation delay of the path. For example, a large slack value indicates the signal path easily meets the required timing. Paths with large slack values typically do not have demanding timing requirements, and therefore, are likely to be easily re-routed. A small slack value indicates that the routed signal path meets timing requirements by a small margin. An alternative path having an acceptable propagation delay is likely to be difficult to find for a signal currently on path with a small slack value. A negative slack value indicates that the current routing of the signal path does not meet timing requirements.

As used herein, a partially routed circuit design includes modified and unmodified signals. A modified signal refers to a routed or unrouted signal that has been added, deleted, or modified from the previous version of the circuit design. An unmodified signal refers to a placed and routed signal that has not been added, deleted, or modified.

In one or more embodiments, the slack of each routed signal is determined prior to incremental place and route. If the slack of a routed signal is less than a slack threshold, routing constraints are generated to prevent rerouting of the signal during the routing process.

FIG. 1 shows a flowchart of a process for an example process for placement and routing of an HDL design. A first version (1.0) of an HDL design 120 is placed and routed at block 102 to produce a first netlist of the routed design 106. In this example, a portion of the version 1.0 HDL design 120 is modified by a designer (not shown) to produce a second version (1.1) of the HDL design 122.

Signals of design version 1.1 that have been previously routed in the first netlist 106 are identified at block 105. Critical ones of the routed signals are determined, and routing constraints are created to preserve the routing of the critical signals at block 106. The design version 1.1 is placed and routed at block 108 using routes of the selected critical signals of design 1.0 and constraints thereon, to produce a non-conflicting solution. Once a non-conflicting solution is found routing constraints are removed from the critical signals at block 110.

If the non-conflicting solution found at block 108 meets timing requirements of the design at decision block 112 the non-conflicting solution may be saved as the netlist of routed design 1.1 (118). Otherwise, post-routing optimization is performed at block 114 to improve timing of the routed circuit design. In post-routing optimization, alternative signal routes that are discovered are analyzed prior to unrouting the signal. The signal is not unrouted and rerouted with an alternative path unless the new path has timing that is better than or equal to that of the current route. In some implementations additional post-routing optimization may be performed at block 116 with restrictions further relaxed to allow signal placement to be modified, this may be referred to as post-placement post-routing optimization. Similar to the optimization performed at block 114, in block 116 the placement and/or routing of a signal is not modified unless analysis indicates that an alternative placement and/or routing will result in timing that is better than or equivalent to the current timing of the signal route. For ease of explanation, post-routing optimization may be used herein to refer to either optimization performed at blocks 114 and 116. Once timing requirements are met, the routed solution is saved as the netlist of routed design 1.1 (118).

Figure 2:
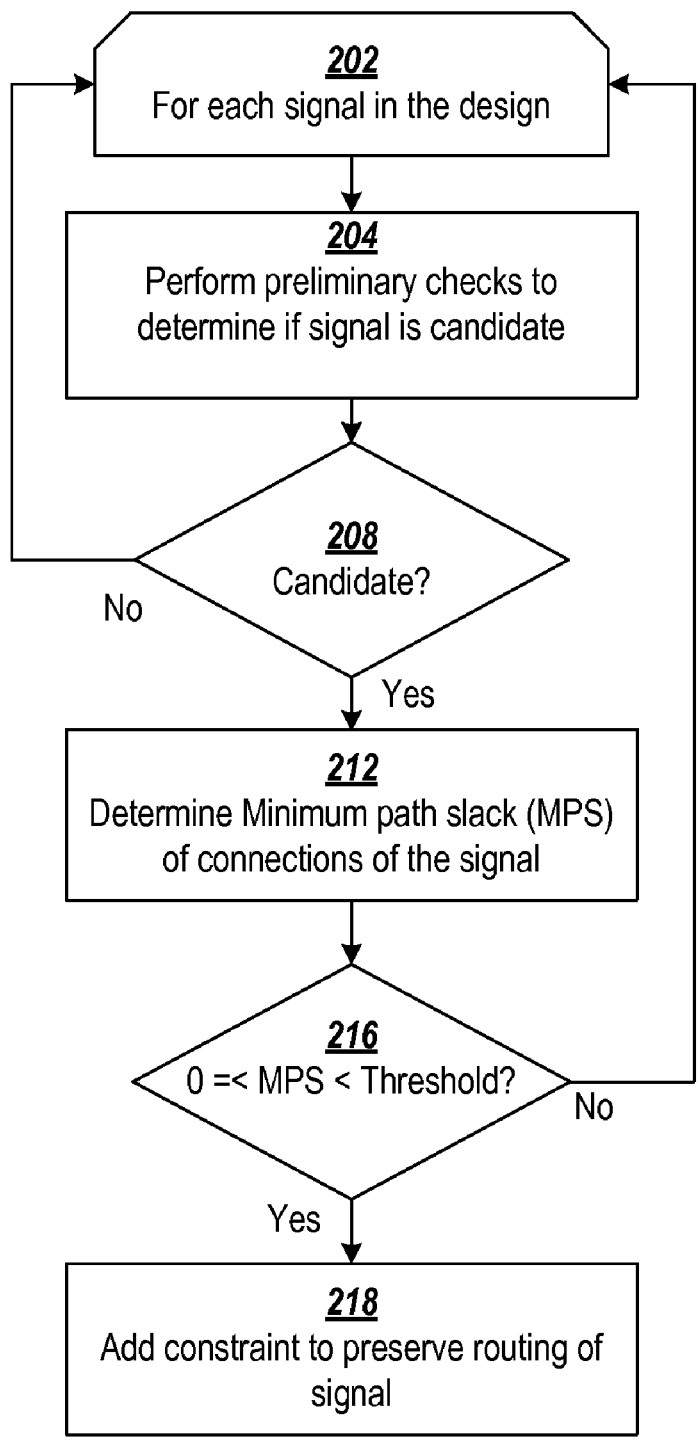
FIG. 2 shows a flowchart of an example process for determining signal routes to preserve during place and route.

FIG. 2 shows a flowchart of an example process for determining which signal routes to preserve during place and route. For each signal in the design, loop 202 performs preliminary checks at block 204 to determine if the signal is a candidate for preservation of its route during routing. The preliminary tests avoid unnecessary processing in later steps. For example, one preliminary test ensures that the signal is fully routed. If not, there is no reason to preserve routing of the signal. Another example preliminary test only considers signals that are imported from previously routed designs as candidates. Yet another example preliminary test may exclude signals that are part of a power grid network from being considered as candidate signals. Signals that have user-defined routing constraints may also be excluded to avoid unintended creation or removal of constraints utilized in another routing protocol. The above preliminary tests may be used to identify and exclude non-critical signals without performing any timing analysis. A signal passing all the preliminary tests performed in block 204 is identified as a candidate at decision step 208 and is further analyzed to determine minimum path slack of the signal.

If the signal has a minimum path slack greater than or equal to zero and less than a threshold (decision block 216), the signal is not likely to be easily re-routable. As a result, routing constraints are generated at block 218 to prevent rerouting of the critical signal. Otherwise, no constraints are placed on the signal, and loop 202 is repeated with the next signal of the circuit design.

Figure 3:
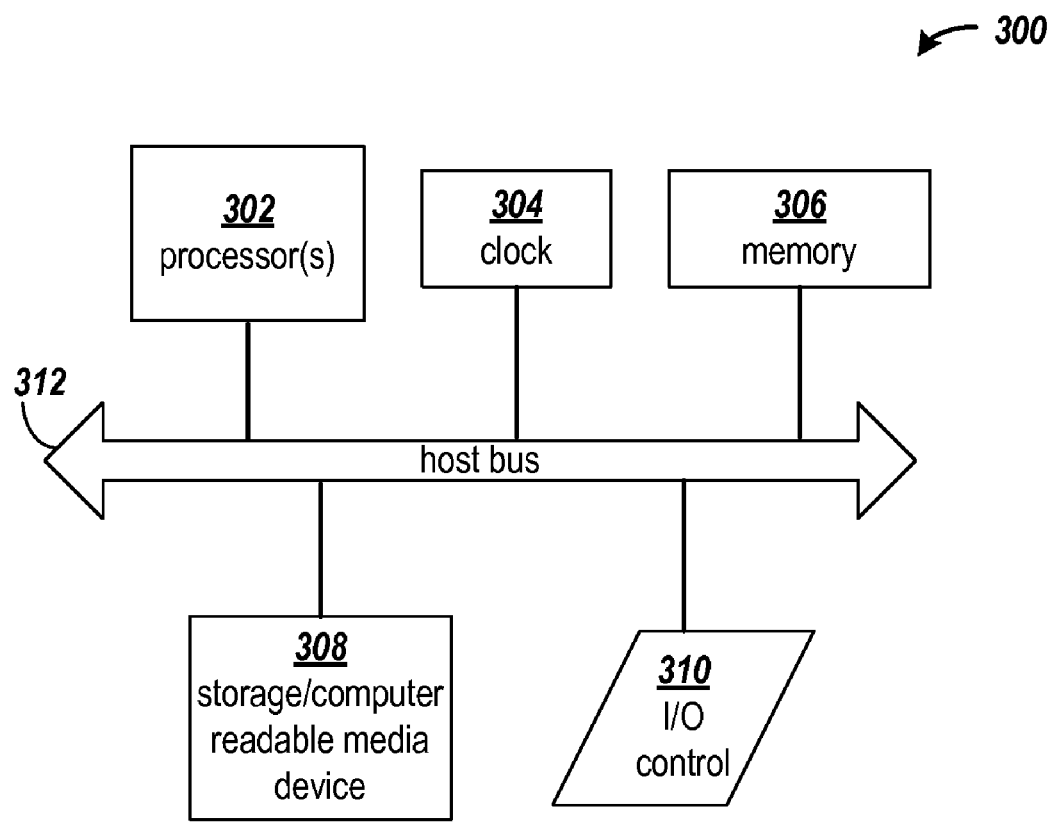
FIG. 3 illustrates a block diagram of a general-purpose processor computing arrangement for implementing the processes described herein.

FIG. 3 illustrates a block diagram of a computing arrangement that may be configured to implement the place-and-route processes described herein. Those skilled in the art will appreciate that various alternative computing arrangements, including one or more processors and a memory arrangement configured with program code, would be suitable for hosting the processes and data structures of the different embodiments. The computer code is encoded in a processor executable format and may be stored and provided via a variety of computer-readable storage media or delivery channels such as magnetic or optical disks or tapes, electronic storage devices, or as application services over a network.

Processor computing arrangement 300 includes one or more processors 302, a clock signal generator 304, a memory unit 306, a storage unit 308, and an input/output control unit 310 coupled to host bus 312. The arrangement 300 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 302 may be one or more general purpose processors or multi-core processors, or a combination of one or more general purpose processors and suitable co-processors, or one or more specialized processors (e.g., RISC, CISC, pipelined, etc.).

The memory arrangement 306 typically includes multiple levels of cache memory and a main memory. The storage arrangement 308 may include local and/or remote persistent storage such as provided by magnetic disks (not shown), flash, EPROM, or other non-volatile data storage. The storage unit may be read or read/write capable. Further, the memory 306 and storage 308 may be combined in a single arrangement.

The processor arrangement 302 executes the software in storage 308 and/or memory 306 arrangements, reads data from and stores data to the storage 308 and/or memory 306 arrangements, and communicates with external devices through the input/output control arrangement 310. These functions are synchronized by the clock signal generator 304. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures of the different embodiments.

Figure 4:
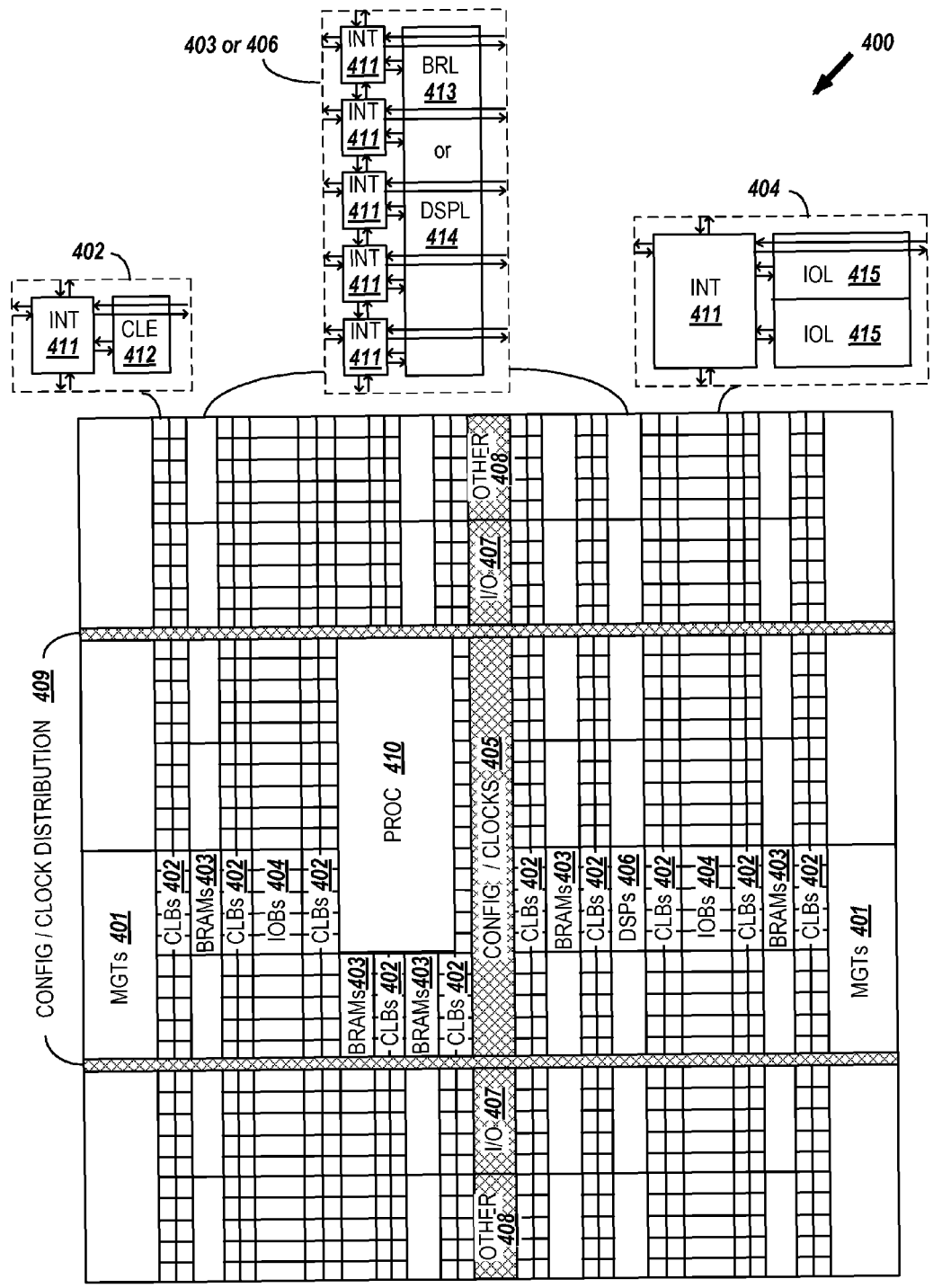
FIG. 4 illustrates a block diagram of an exemplary target integrated circuit for which a circuit design may be placed and routed.

FIG. 4 is a block diagram of an example field programmable gate array (FPGA) which may be used as a target device for place-and-route, for example. FPGAs can include several different types of programmable logic blocks in the array. For example, FIG. 4 illustrates an FPGA architecture (400) that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407), for example, clock ports, and other programmable logic 408 such as digital clock managers, analog-to-digital converters, system monitoring logic, and so forth. Some FPGAs also include dedicated processor blocks (PROC 410). While not shown, it will be appreciated that FPGA 400 also includes external and internal reconfiguration ports.

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic plus a single programmable interconnect element INT 411. A BRAM 403 can include a BRAM logic element (BRL 413) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used.

A DSP tile 406 can include a DSP logic element (DSPL 414) in addition to an appropriate number of programmable interconnect elements. With the FPGA as the target device, an inference pattern would be provided for the DSP logic element(s) available on the device. If portions of the design are found to be optimal, after timing analysis, those portions would be implemented by the DSP elements.

An IOB 404 can include, for example, two instances of an input/output logic element (IOL 415) in addition to one instance of the programmable interconnect element INT 411. As will be clear to those of skill in the art, the actual I/O pads connected, for example, to the I/O logic element 415 are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual FPGA more than one adjacent column of CLBs is typically included wherever the CLBs appear, to facilitate the efficient implementation of user logic.

The disclosed embodiments are thought to be applicable to a variety of systems for a placement and routing of circuit designs. Other aspects and embodiments will be apparent to those skilled in the art from consideration of the specification. It is intended that the specification and illustrated embodiments be considered as examples only, with a true scope and spirit of the invention being indicated by the following claims.

What is claimed is:

1. A method of routing a partially routed circuit design having modified and unmodified signals from a previous version of the circuit design, comprising:
using at least one processor programmed to perform operations including:
determining critical routed signals of the partially routed circuit design;
for each critical routed signal, applying a first set of routing constraints to prevent rerouting of the critical routed signal;
routing the partially routed circuit design according to the first set of routing constraints to produce a non-conflicting routing solution; and
in response to the non-conflicting routing solution not meeting timing requirements:
removing the first set of routing constraints; and
performing post-routing timing optimization on the non-conflicting routing solution to reduce propagation delay of one or more signals.

2. The method of claim 1, wherein the post-routing timing optimization includes:
determining an alternative route of a signal;
determining timing of the alternative route; and
rerouting the signal using the alternative route only if the timing of the alternative route is better than or equivalent to the timing of the signal.

3. The method of claim 1, wherein determining the critical routed signals includes determining each signal of partially routed circuit design having an end-to-end minimum path slack equal or greater than zero and less than a slack threshold, the minimum path slack indicating a difference between signal arrival time and a time required by timing constraints.

4. The method of claim 3, wherein the end-to-end minimum path slack is determined for setup-times of elements of the circuit design.

5. The method of claim 1, wherein determining critical routed signals determines the critical routed signals from a subset of candidate signals that includes only signals of the partially routed circuit design that are fully routed.

6. The method of claim 5, wherein the subset of candidate signals does not include power distribution network or ground signals of the partially routed circuit design.

7. The method of claim 5, wherein the subset of candidate signals only includes signals that are included in the previous version of the circuit design.

8. The method of claim 1, wherein the post-routing timing optimization reroutes one or more signals according to one or more timing requirements.

9. The method of claim 8, wherein the post-routing timing optimization changes placement of one or more component pins.

10. The method of claim 9, wherein the rerouting of the one or more signals reroutes the one or more signals while reducing propagation delays of the one or more signals.

11. The method of claim 1, wherein the routing the partially routed circuit design according to the first set of routing constraints routes signals of the circuit design while reducing costs of routing resources used in routes of the signals.

12. The method of claim 1, wherein the routing the partially routed circuit design according to the first set of routing constraints routes one or more signals of the partially routed circuit design according to a routing algorithm that uses timing analysis data of the one or more signals.

13. A system for routing of a partially routed circuit design having modified and unmodified signals from a previous version of the circuit design, the system comprising:
a processor; and
a memory arrangement coupled to the processor, wherein the memory arrangement is configured with instructions that when executed by the processor cause the processor to perform operations including:
determining critical routed signals of the partially routed circuit design;
for each critical routed signal, applying a first set of routing constraints to prevent rerouting of the critical routed signal;

routing the partially routed circuit design according to the first set of routing constraints to produce a non-conflicting routing solution; and in response to the non-conflicting routing solution not meeting timing requirements:

removing the first set of routing constraints; and performing post-routing timing optimization on the non-conflicting routing solution to reduce propagation delay of one or more signals.

14. The system of claim 13, wherein determining the critical routed signals includes determining each signal of partially routed circuit design having an end-to-end minimum path slack equal or greater than zero and less than a slack threshold, the minimum path slack indicating a difference between signal arrival time and a time required by timing constraints.

15. The method of claim 14, wherein the end-to-end minimum path slack is determined for setup-times of elements of the circuit design.

16. The method of claim 13, wherein determining critical routed signals determines the critical routed signals from a subset of candidate signals that includes only signals of the partially routed circuit design that are fully routed.

17. The method of claim 16, wherein the subset of candidate signals does not include power distribution network or ground signals of the partially routed circuit design.

18. The method of claim 16, wherein the subset of candidate signals only includes signals that are included in the previous version of the circuit design.

19. The method of claim 13, wherein the post-routing timing optimization includes:

determining an alternative route of a signal;

determining timing of the alternative route; and rerouting the signal using the alternative route only if the timing of the alternative route is better than or equivalent to the timing of the signal.

20. An article of manufacture, comprising:

a processor-readable storage medium configured with processor-executable instructions causing one or more processors to route a partially routed circuit design having modified and unmodified signals from a previous version of the circuit design, the instructions when executed by a processor causing the processor to perform operations including:

determining critical routed signals of the partially routed circuit design;

for each critical routed signal, applying a first set of routing constraints to prevent rerouting of the critical routed signal;

routing the partially routed circuit design according to the first set of routing constraints to produce a non-conflicting routing solution; and in response to the non-conflicting routing solution not meeting timing requirements:

removing the first set of routing constraints; and performing post-routing timing optimization on the non-conflicting routing solution to reduce propagation delay of one or more signals.

\* \* \* \* \*